United States Patent

Erlandson et al.

[15] 3,678,241
[45] July 18, 1972

[54] INERT ATMOSPHERE TACK WELDER

[72] Inventors: Paul M. Erlandson, Palos Park; Anton A. Aschberger, Oak Lawn; John T. Cary, Markham, all of Ill.

[73] Assignee: Continental Can Company, Inc., New York, N.Y.

[22] Filed: July 31, 1970

[21] Appl. No.: 59,932

[52] U.S. Cl. .................................. 219/72, 219/64, 219/74
[51] Int. Cl. ................................ B23k 9/16, B23k 35/38
[58] Field of Search ........................... 219/72, 74, 64

[56] References Cited

UNITED STATES PATENTS

| 1,552,369 | 9/1925 | White | 219/72 |
| 1,749,765 | 3/1930 | Hendrickson | 219/74 |
| 3,458,681 | 7/1969 | Wilson | 219/74 |
| 3,457,387 | 7/1969 | Nelson et al. | 219/72 X |
| 853,351 | 5/1907 | Fulton | 219/64 X |
| 1,055,261 | 3/1913 | Ellinger | 219/72 |
| 2,794,108 | 5/1957 | Park | 219/67 |

FOREIGN PATENTS OR APPLICATIONS

| 65,888 | 2/1914 | Austria | 219/72 |

Primary Examiner—J. V. Truhe
Assistant Examiner—Hugh D. Jaeger
Attorney—Diller, Brown, Ramik & Holt

[57] ABSTRACT

This disclosure relates to spot resistance welding or tack welding of edge portions of sheet material, particularly the welding of seams of containers. Means are provided for effecting gaseous flow around each of a pair of opposed electrodes with the flowing gas being preferably an inert gas and the flow being selectively one of pressure to one electrode and vacuum or partial vacuum to the other or pressure flow to both electrodes. Inert gas flow between the sheet portions being welded is also obtained.

14 Claims, 4 Drawing Figures

PATENTED JUL 18 1972
3,678,241
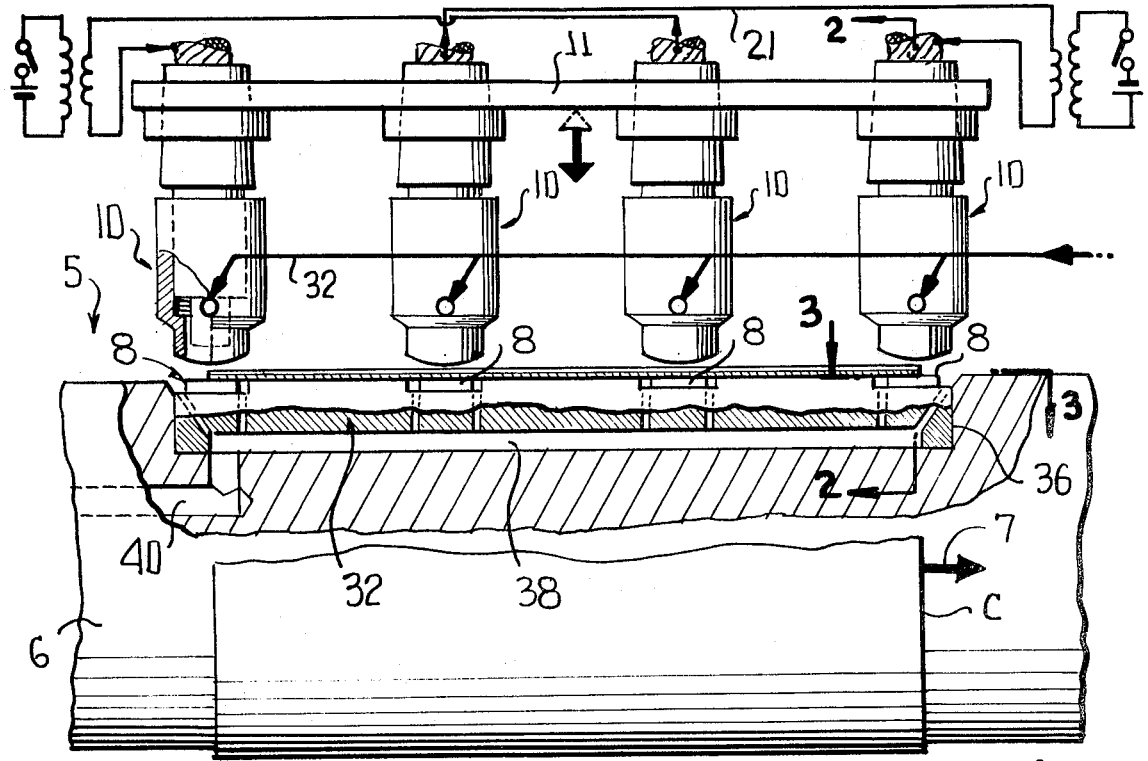
FIG.1
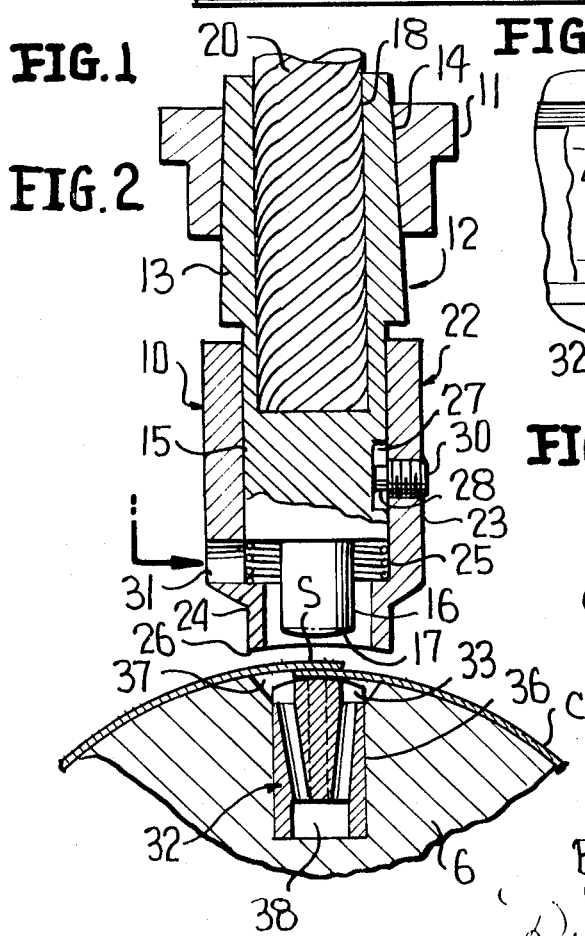
FIG.2
FIG.3
FIG.4
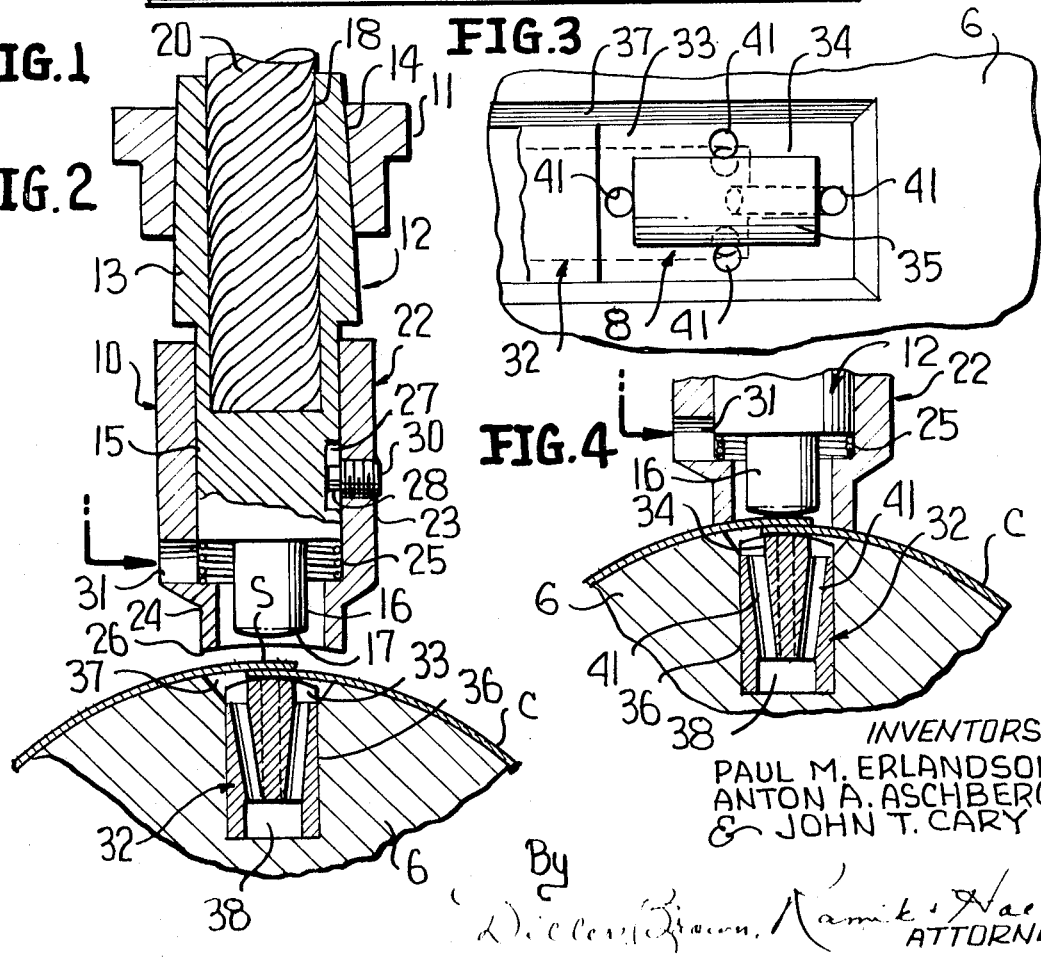
INVENTORS
PAUL M. ERLANDSON,
ANTON A. ASCHBERGER
& JOHN T. CARY
By
ATTORNEYS

INERT ATMOSPHERE TACK WELDER

This invention relates in general to new and useful improvements in spot resistance welding, and more particularly relates to the spot or tack welding of containers under the influence of an inert atmosphere.

BACKGROUND OF THE INVENTION

It is well known in the processes of arc spot and arc seam welding to use an inert atmosphere to promote a smooth, quiet arc, lower arc voltage for a specific current value and to effect a scouring action (similar to a sand-blast) of the surface being welded. Argon and helium, or a mixture thereof, are the most commonly used gases for shielding, although carbon dioxide is used for high production arc spot welding because of its relatively low costs.

Although there has been the use of inert gases with respect to spot and seam welding, as indicated above, they are restricted to arc welding. There has been no known suggestion that an inert atmosphere can be beneficially utilized in resistance welding.

SHORT DESCRIPTION OF INVENTION

In accordance with this invention, it has been found that the use of an inert or protective atmosphere in resistance spot welding processes provides numerous advantages which include the following:

1. Electrode life is enhanced because of the cooling effect of the gas flow as well as a reduction in the formation of oxide on the electrode tip by the exclusion of oxygen from the tip area. For example, carbon dioxide may be used and will not be broken down into its constituents by the electrode temperature.

2. Current density will be more uniform throughout the contact area because of the prevention of the relatively high resistance oxide on portions of the electrode tip.

3. Less oxide will be formed at the interface of the workpieces to be joined.

Although the first two advantages are important, the third advantage is a primary one in that control of a resistance welding process depends upon a consistent level of current and resistance, particularly at the interface. Power ($I^2R$) as well as energy ($I^2Rt$) input can then be well controlled and a commercially successful welding process thereby achieved.

In a particular embodiment of this invention, there is provided a plurality of tack welding electrodes and one or more opposing electrodes to provide for an electrical return connection to the power supply. The ground electrodes are normally fixedly carried by a support and have gas flow passages therethrough with gas being delivered to a gas flow area surrounding a projecting contacting portion thereof. The opposing electrodes are preferably encased within a shield which is contoured to form a general seal with the surface being welded and which first comes into contact with the work. Thereafter, the other electrode engages the work with it being shielded with respect to the atmosphere by gas flowing between the shield and the electrode. If desired, the inert gas may be supplied under pressure to both of the electrodes. On the other hand, a more efficient inert gas flow may result with the gas being supplied to one of the electrodes and a vacuum being drawn relative to the other electrode to pull the inert gas between the lapped sheet material portions to be welded.

With the above and other objects in view that will hereinafter appear, the nature of the invention will be more clearly understood by reference to the following detailed description, the appended claims and the several views illustrated in the accompanying drawings:

IN THE DRAWINGS:

FIG. 1 is a schematic side elevational view with parts broken away and shown in section of a four unit tack welder for tack welding together the seam portion of a can body.

FIG. 2 is an enlarged fragmentary vertical sectional view taken along the line 2—2 of FIG. 1 and shows specifically the details of a pair of electrodes.

FIG. 3 is an enlarged fragmentary horizontal sectional view taken along the line 3—3 of FIG. 1 and shows specifically the configuration of one of the electrodes.

FIG. 4 is an enlarged fragmentary vertical sectional view similar to the lower portion of FIG. 2 and shows the electrodes in their operative positions.

Referring now to the drawings in detail, it will be seen that there is illustrated a tack welding apparatus for tack welding the seam of a tubular body, such as a can body, the apparatus being generally identified by the numeral 5. The apparatus 5 includes a suitable support 6 which is illustrated as being in the form of a horn and along which a can body C will be moved in the direction of the arrow 7 after the seam has been tack welded for a further and complete welding of the seam.

The support 6 is provided with a first or ground electrode 8 which may be a single bar electrode or a plurality of electrodes and will be identified in more detail hereinafter. In the welding of a tubular body, such as the can body C, the electrode or electrodes 8 will be the internal electrodes. Associated with the internal electrodes 8 are one or more second or external electrodes identified by the numeral 10. In the illustrated form of the invention, the internal electrodes 8 are stationary and the external electrodes 10 are movable in unison to cooperate with the electrodes 8 to effect the formation of a plurality of spot or tack welds by a resistance welding process. The external electrodes 10 are carried by a common support for movement towards and away from the support 6 in any suitable manner.

At this time it is pointed out that although the electrodes 10 are illustrated in overlying relation with respect to the electrodes 8, it is to be understood that if desired, the electrodes 8 could be positioned at the underside of the horn 6 with the result that the electrodes 10 would face upwardly towards the horn 6 from below. This orientation of the electrodes is a matter of choice which in of itself is no part of this invention. It is also to be understood that the number of sets of electrodes 8 and 10 is also a matter of choice and of itself is in no way a part of this invention.

Referring now to FIG. 2 in particular, it will be seen that the specific details of an electrode unit 10 are illustrated. Electrode unit 10 includes an electrode which is identified by the numeral 12 and preferably includes a body portion 13 which is externally tapered for wedging engagement within a tapered socket 14 formed in the support 11. In this manner, the mounting of the electrode 12 with respect to the support 11 is facilitated. The electrode 12 also includes a body portion 15 which is cylindrical and is of a reduced cross section as compared to the body portion 13. The electrode 12 further includes a reduced diameter contacting portion 16 which terminates in a transversely curved work engaging surface 17.

The electrode 12 may be connected to a power source in any desired manner. In FIG. 2 there is illustrated a bore 18 in the body portions 13 and 15 in which a terminal end of a pigtail 20 is bonded. The pigtails 20 from the various electrodes will be connected to an electrical source by means of one or more electrical connections 21 to the power supply to effect the optimal series/parallel connections to the electrode lead 21 (FIG. 1).

In order that an inert gas may be associated with the electrode 12, the electrode unit 10 includes a shield which is identified by the numeral 22. The shield 22 includes a cylindrical portion 23 which is telescoped over the body portion 15 of the electrode 12. The shield 22 also includes a free end portion 24 of a reduced diameter which is telescoped over and normally projects beyond the surface 17 so that the shield 22 comes into engagement with a workpiece to form a seal therewith prior to the engagement of the workpiece by the electrode 12.

The shield 22 is urged into its projecting position by means of a spring 25 which is seated at its opposite ends against the electrode body portion 15 of the shied shield portion 24. The lower end of the shield 22 is configured as at 26 to match the workpiece surface. In order that the orientation of the shield 22 with respect to the electrode 12 may be maintained, the body portion 15 is provided with a vertical slot 27 in which an end portion 28 of a set screw 30 carried by the shield 22 is positioned. This prevents relative rotation of the shield 22 with respect to the electrode 12.

The lower part of the shield portion 23 is provided with an opening 31 through which a gas may flow. The opening 31 may be connected to a suitable flow line 29, as is shown in FIG. 1. It is to be noted that the opening 31 is normally disposed between the electrode body portion 15 and the free end 26 of the shield 22 so that gas flow through the shield 22 around the contacting portions 16 of the electrode may occur. It is also to be noted that there is a piston and cylinder relationship between the electrode portion 15 and the shield portion 23 so that a pressurization of gases within the lower portion of the shield 22 may occur after a seal between the shield and the work has been made. This will assure a burst of gas under pressure immediately before the electrode engages the work.

Reference is now made to the construction of the ground electrodes 8. Although the ground electrodes 8 may be formed as individual electrodes, it is preferred that they be made as common parts of a single bar which is identified by the numeral 32. At the desired point, the bar 32 is recessed as at 33 in FIG. 3 to define a projecting contacting portion 34 terminating in a transversely curved work engageable surface 35.

It is to be noted that the horn 6, as is best shown in FIG. 2, is provided with a longitudinal groove 36 in which the bar 32 is seated. It is to be understood that the bar 32 may be secured in the groove 36 in any desired manner and at least the lower portion of the bar 32 should tightly fit the groove 36 so as to prevent free flow of gases between the bar 32 and the support 6 out through the groove 36.

The upper portion of the groove 36 is flared as at 37 surrounding the bar 32 with the flared portion 37 of the recess cooperating with the recessed portions 33 of the bar to define a gas flow area. It is to be understood that the gas flow area extends the full length of the bar 32. Thus, the seam S to be tack welded is exposed to gaseous flow for the full length thereof.

In order that there may be gaseous flow in the area of each of the electrodes 8, the inner surface of the bar 32 is provided with a gas passage. The gas flow groove 38 extends substantially the full length of the bar 32, as is shown in FIG. 1, and is in communication with a gas passage 40 which extends out through the supported end of the horn 6.

In order that there may be gas flow into the gas flow area defined by the recesses 33 and the groove portions 37, around each projecting contacting portion 34 a plurality of gas ports 41 are formed, as is best shown in FIG. 3. It is to be noted that the gas ports 41 which are transversely aligned are disposed in angular relation so as to be normal to the tangents of the surface 35. The longitudinally aligned ports 41 may be normal to the groove 38 except the terminal ports disposed at the extreme ends of the bar 32 which are sloped, as is best shown in FIG. 1.

It is to be understood that there may be several variations of gas flow. For example, an inert gas may be directed to the electrode units 10 through the line 32 and a vacuum may be drawn in the groove 38 of the bar 32 through the passage 40. By drawing a vacuum around the electrodes 8, the inert gas delivered to the outer surface of the seam S may be drawn between the inner faces of the edge portions which are to be tack welded together, thereby assuring that the contacting surfaces at the interface are within an inert atmosphere.

Although the preferred arrangement is to introduce an inert gas into the electrode units 10 and pull a vacuum around the electrodes 8, it is to be understood that the gas flow may be reversed. It is also to be understood that under certain circumstances, an inert gas may be supplied under pressure to both the electrodes 8 and electrode units 10.

It is to be understood that a consistent resistance of the contacts between the electrodes and the workpiece and between the contacting faces of the workpiece greatly enhance the formation of a desired type of weld. Under certain conditions, it is desirable that the energy input at each weld spot be such that melting does not occur, but that the metal be heated to a temperature whereby under the pressure exerted on the metal between the electrodes 8 and 12, forge welding will occur. When such a weld is to be formed, the latitude of permissible temperature is very narrow. It is quite apparent that if the temperature is too high, melting will occur. On the other hand, if the temperature is too low, a proper weld or bond will not be formed.

It will be readily apparent by eliminating oxide formation on the contacting surfaces of the electrodes, a constant resistance of the contacts between the electrodes and the work may be obtained. In a like manner, by flushing out the air between the faces to be welded together, a more constant face contact resistance or seam resistance may be obtained.

Although the welding occurs in a protective atmosphere and thus oxidation both during and subsequent to welding is controlled, the primary feature of the protective atmosphere is to maintain variations in the resistances at a minimum, thereby permitting the metal to be heated to substantially the same temperature upon the formation of each tack weld, thereby providing for accurate control of the weld formation.

Although only a preferred embodiment of the invention has been specifically illustrated and described herein, it is to be understood that minor modifications may be made in the electrode constructions without departing from the spirit and scope of the invention, as defined by the appended claims.

We claim:

1. A tach welder for lapped sheet material edge portions, said tack welder comprising a support, a first electrode carried by said support, a second electrode opposing said first electrode and cooperable therewith to effect the tack welding of material, each of said electrodes having a projecting contact surface, gas flow means surrounding each contact surface, and means for effecting inert gas flow between and around said electrode contacting surfaces and into through and out between the lapped sheet material edge portions.

2. The tack welder of claim 1 wherein said gas flow means for said second electrode includes a shield surrounding said second electrode and normally projecting therebeyond, means mounting said shield for telescoping movement relative to said second electrode facilitating engagement of said second electrode with material to be welded subsequent to initial contact by said shield, and gas flow means connected to said shield for effecting gas flow within said shield around said second electrode.

3. The tack welder of claim 2 wherein said gas flow means for said first electrode includes a gas flow area generally surrounding the projecting contact surface thereof, gas ports extending through said first electrode and opening into said gas flow area, and means for effecting gas flow through said gas ports.

4. The tack welder of claim 3 wherein said first electrode is partially recessed in said support and said support at least in part defines said gas flow area.

5. The tack welder of claim 3 wherein there is a plurality of said first and second electrodes and said first electrodes are of a unitary construction in the form of an elongated bar, and at least a portion of said gas flow area is defined by an adjacent part of said bar.

6. The tack welder of claim 2 wherein there is a piston-cylinder relationship between portions of said second electrode and said shield whereby momentary compressing of gases entrapped within said shield between said second electrode and sheet material being welded occurs.

7. The tack welder of claim 2 wherein said tack welder is particularly adapted to engage transversely curved sheet portions, said shield has an end contoured to mate with the sheet portions being welded, and pin and slot interlocking means directly between said shield and said electrode for preventing rotation of said shield as it telescopes relative to said second electrode.

8. The tack welder of claim 1 wherein said gas flow means for said first electrode includes a gas flow area generally surrounding the projecting contact surface thereof, gas ports extending through said first electrode and opening into said gas flow area, and means for effecting gas flow through said gas ports.

9. The tack welder of claim 8 wherein said first electrode is partially recessed in said support and said support at least in part defines said gas flow area.

10. The tack welder of claim 8 wherein there is a plurality of said first and second electrodes and said first electrodes are of a unitary construction in the form of an elongated bar, and at least a portion of said gas flow area is defined by an adjacent part of said bar.

11. The tack welder of claim 1 wherein said tack welder is primarily adapted to be used in the formation of tubular bodies and said support is in the form of a horn adapted to substantially fit the tubular body, and said second electrode is carried by a second support movable towards and away from said horn.

12. The tack welder of claim 11 wherein there are a plurality of said first and second electrodes with said first electrodes being formed as a common bar, said bar is seated in said support, said bar has a gas distributing groove in the underside thereof, and said support has gas flow means incorporated therein in communication with said gas distributing groove.

13. The tack welder of claim 1 wherein said gas flow means for said second electrode includes a shield surrounding said second electrode and normally projecting therebeyond, means mounting said shield directly on said second electrode for telescoping movement relative to said second electrode facilitating engagement of said second electrode with material to be welded subsequent to initial contact by said shield, and gas flow means connected to said shield for effecting gas flow within said shield around said second electrode.

14. The tack welder of claim 1 wherein said means for effecting inert gas flow includes means for supplying inert gas to one of said electrodes, and means for drawing a vacuum at the other of said electrodes.

* * * * *